UNITED STATES PATENT OFFICE.

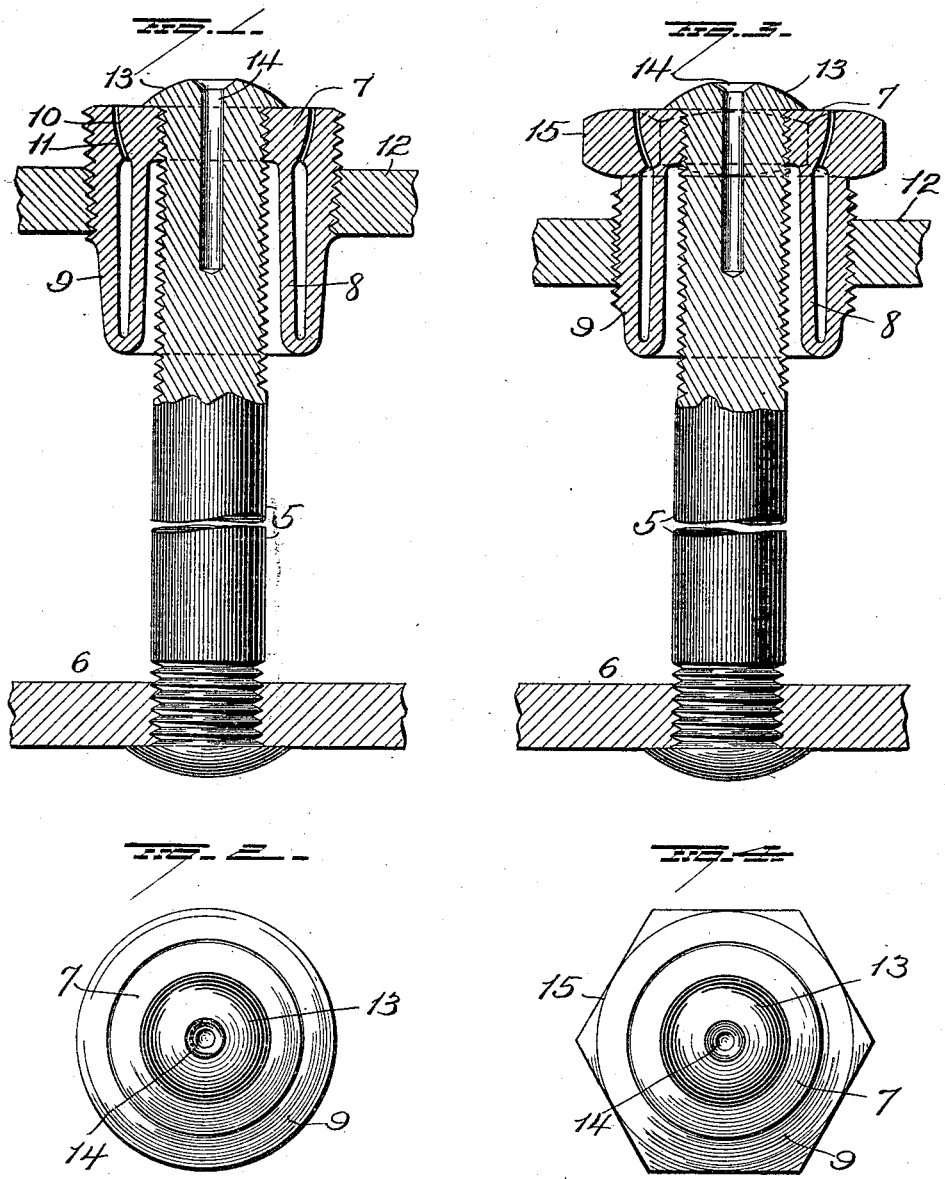

HARRY ANTHONY LACERDA, OF SCHENECTADY, NEW YORK, ASSIGNOR TO FLANNERY BOLT COMPANY, OF SCHENECTADY, NEW YORK.

STAY-BOLT FOR BOILERS.

1,272,465.   Specification of Letters Patent.   Patented July 16, 1918.

Application filed October 25, 1917. Serial No. 198,460.

*To all whom it may concern:*

Be it known that I, HARRY ANTHONY LACERDA, a citizen of the United States, and a resident of Schenectady, in the county of Schenectady and State of New York, have invented certain new and useful Improvements in Stay-Bolts for Boilers; and I do hereby declare the following to be a full, clear, and exact description of the invention, such as will enable others skilled in the art to which it appertains to make and use the same.

This invention relates to an improvement in stay bolts for boilers and is designed more particularly as an improvement on the construction disclosed in Patent No. 1,130,525 granted to me March 2, 1915.

The construction disclosed in my patent comprises a nut having an inwardly projecting sleeve the latter being rigidly connected at its rear or inner end to the rear or inner end of a tubular plug screwed into an outer sheet of a boiler, the sleeve of the nut being constructed, preferably corrugated transversely of the axis of the stay bolt, to permit the sleeve to expand or contract in a longitudinal direction without affecting the position of the nut on the end of the bolt, the outer end of the nut forming with the outer end of the plug, a ball and socket joint.

The object of the present invention is to so connect the nut and plug as to provide for lateral bolt movement, and it consists in the details of construction as will be more fully explained and pointed out in the claims.

In the accompanying drawings, Figure 1 is a view in section of my improvement applied to a flush bolt; Fig. 2 is a view in plan of the same; Fig. 3 is a similar view of the improvement applied to a projecting bolt and Fig. 4 is a view in plan of the same.

5 represents the stay bolt preferably, but not necessarily threaded throughout its entire length, secured at its inner end to the inner sheet 6 of the boiler, and at its outer end to the nut 7. This nut is provided with an inwardly projecting straight sleeve or skirt 8, which is integrally united by a U-bend with the inner end of the tubular plug 9, the sleeve or skirt and the plug being sufficiently thin at the juncture, and immediately above the latter, to permit of limited lateral movement of the nut within the plug, without special provision for longitudinal movement of the bolt. The outer end or head of the nut 7, is curved as at 10, and this curved portion is adapted to engage a curved seat 11 formed in the plug at the outer end of the latter forming in effect a ball and socket joint, there being normally a sufficient clearance between the curved surface of the head of the nut and the curved seat in the plug, to permit of the slight lateral movement of the head of the nut 7 within the plug. These curved surfaces also take the major portion of the stress on the bolt due to expansive strains on the boiler sheets.

The plug 9 is externally threaded at its outer end and is screwed into the outer sheet 12 of the boiler, as shown, and I have also shown the bolt secured by thread connection with the nut, the extreme outer end of the bolt being upset as at 13, over the outer exposed face of the nut, and provided with the usual tell-tale bore 14.

Figures 1 and 2 show my improvement applied to a flush type of bolt and Figs. 3 and 4 to a projecting bolt.

In this modification, the outer end of the plug is made angular as at 15 for the attachment of a wrench. In other respects the two devices are substantially the same.

Having fully described my invention what I claim as new and desire to secure by Letters-Patent, is:—

1. A stay bolt structure comprising an integral nut and plug, the plug having a seat to be engaged by the nut, the nut being within the plug and connected thereto at its inner end only, and in rear of the said seat by a U-shaped bend, and a bolt secured to the nut.

2. A stay bolt structure comprising a plug having an internal curved seat at its outer end, a nut having an integral inwardly projecting sleeve, the inner end of the latter being integrally connected to the inner end of the plug by a U-shape bend, and a bolt passing through the sleeve of the nut and rigidly secured to the nut, the said nut having a curved outer face coincident with the curved seat in the plug and conforming in shape to the latter.

3. A stay bolt structure comprising a plug having an internal curved seat at its outer end, a nut having an inwardly projecting integral sleeve, the latter being integrally connected to the inner end of the plug by a U-shape bend, the nut having a curved outer face conforming in shape to the curvature of the seat in the plug and adapted to engage the same, and a bolt screwed into the head of the nut and locked thereto by upsetting its end over the outer face of the nut.

In testimony whereof, I have signed this specification in the presence of two subscribing witnesses.

HARRY ANTHONY LACERDA.

Witnesses:
　Mrs. WM. RENNIX,
　WM. B. RENNIX.

Copies of this patent may be obtained for five cents each, by addressing the "Commissioner of Patents, Washington, D. C."